US010747191B2

(12) United States Patent
Kienzle et al.

(10) Patent No.: US 10,747,191 B2
(45) Date of Patent: Aug. 18, 2020

(54) METHOD FOR CREATING OR MACHINING TOOTHINGS ON WORKPIECES BY GEAR SHAPING WITH REGULATION OF SPINDLE ROTATION SETPOINTS

(71) Applicant: GLEASON-PFAUTER MASCHINENFABRIK GMBH, Ludwigsburg (DE)

(72) Inventors: Florian Kienzle, Leinfelden (DE); Sven Mayer, Stuttgart (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 109 days.

(21) Appl. No.: 15/770,652

(22) PCT Filed: Nov. 3, 2016

(86) PCT No.: PCT/EP2016/001829
§ 371 (c)(1),
(2) Date: Apr. 24, 2018

(87) PCT Pub. No.: WO2017/076503
PCT Pub. Date: May 11, 2017

(65) Prior Publication Data
US 2018/0314226 A1 Nov. 1, 2018

(30) Foreign Application Priority Data
Nov. 5, 2015 (DE) .................. 10 2015 014 313

(51) Int. Cl.
*G05B 19/18* (2006.01)

(52) U.S. Cl.
CPC .. *G05B 19/186* (2013.01); *G05B 2219/35035* (2013.01); *G05B 2219/36198* (2013.01); *Y02P 90/265* (2015.11)

(58) Field of Classification Search
CPC ........ G05B 19/186; G05B 2219/36198; G05B 2219/35035; Y02P 90/265
See application file for complete search history.

(56) References Cited

U.S. PATENT DOCUMENTS

| 5,136,522 A | 8/1992 | Loehrke |
| 7,156,718 B2 | 1/2007 | Klingelnberg |
| 2011/0320154 A1* | 12/2011 | Wakizaka ............ G01D 5/145 |
| | | 702/94 |

FOREIGN PATENT DOCUMENTS

| DE | 10343854 A1 | 5/2005 |
| EP | 2853331 A2 | 4/2015 |
| WO | 2015/146661 A1 | 10/2015 |

OTHER PUBLICATIONS

The Vibration Detection System of CNC Machine Tools and the Application of Spindle Test. Article. [online]. Y.H. Wu, L.W. Rao, D.H. Zhao and K. Zhang. [retrieved on Sep. 29, 2019]. Retrieved from internet: <URL: http://citeseerx.ist.psu.edu/viewdoc/download?doi=10.1.1.847.1029&rep=repl&type=pdf> (Year: 2011).*

(Continued)

*Primary Examiner* — Robert E Fennema
*Assistant Examiner* — Marzia T Monty
(74) *Attorney, Agent, or Firm* — Robert L. McDowell

(57) ABSTRACT

The invention relates to a method for creating or machining toothings on workpieces in rolling machining engagement, in particular by gear shaping, in which an NC control of the rotary spindle drives of workpiece and tool comprises regulation of the rotation angle position of each particular spindle to setpoints depending on the process parameters associated with the process design underlying the method, wherein data containing information relating to a deflection, caused by the process forces that arise during machining and resulting in profile shape deviations on the workpiece, of the position of the tool flanks of tool and workpiece out of their (Continued)

Figure 1A:
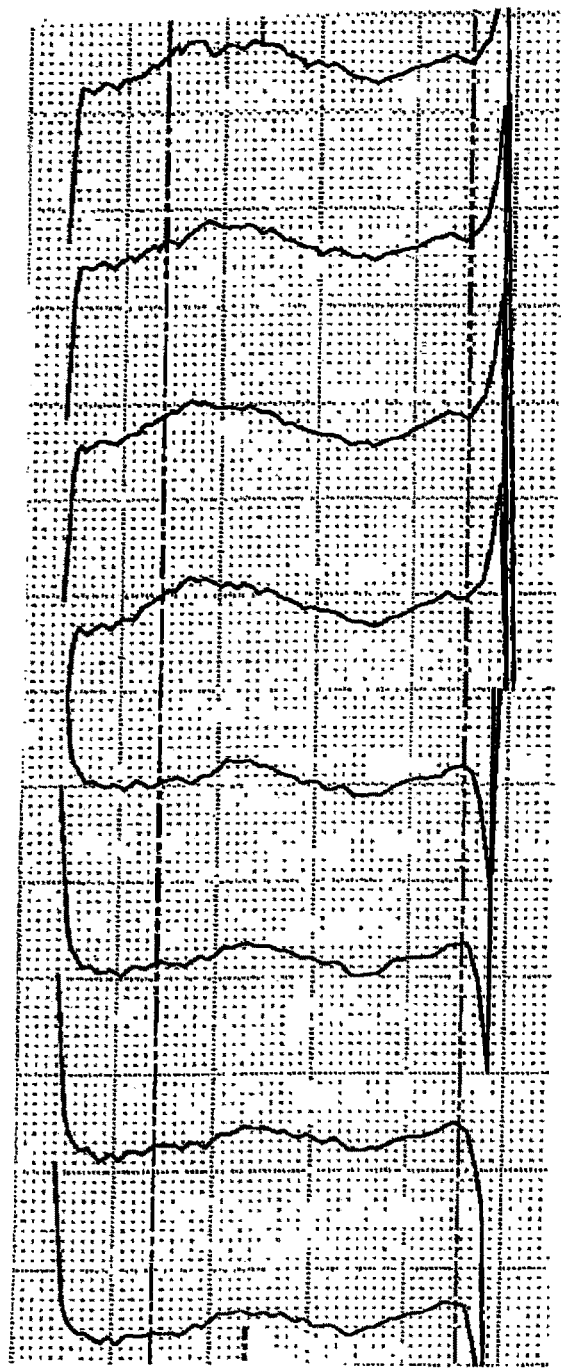

position intended as per the process design, are used to determine a correction, taking the deflection into account, of the rotation angle position of workpiece spindle and/or tool spindle and thus to modify the setpoints of the regulation.

16 Claims, 2 Drawing Sheets

(56) References Cited

OTHER PUBLICATIONS

Search Report from the German Patent and Trademark Office for DE Appln. No. 102015014313.1, dated Jul. 25, 2016, 5 pgs.
International Search Report and Written Opinion for PCT/EP2016/001829, ISA/EPO, dated Mar. 9, 2017, 16 pgs.

* cited by examiner

METHOD FOR CREATING OR MACHINING TOOTHINGS ON WORKPIECES BY GEAR SHAPING WITH REGULATION OF SPINDLE ROTATION SETPOINTS

The invention relates to a method for creating or machining toothings on workpieces in rolling machining engagement, in particular by gear shaping, in which NC control of the rotary spindle drives of workpiece and tool comprises regulation of the rotation angle position of each particular spindle to setpoints determined depending upon the process parameters associated with the process design underlying the method.

Such procedures are well known to a person skilled in the art in the field of toothing technology and comprise, for example, the gear shaping and gear hobbing of toothings. The method is based on a process design whose determination begins with the parameters of the workpiece to be created. These are generally specified by the users and concern the workpiece diameter and its number of teeth, and with it the module of the toothing to be created, as well as the helix angle and, if necessary, tooth-flank modifications such as crowns, etc. In addition to these workpiece parameters, the tool parameters, such as a shaper cutter for the shaping process or a hob cutter for the hob-cutting process are determined, as well as the process design. The number of teeth as well as the diameter for the tool are considered here and, as process or technology parameters, the number of cycles (rough machining cycles, finishing cycles) as well as, for example, the number of strokes per pitch during gear shaping. For trial purposes, the process design is tested for its functional efficiency and, if necessary, adjusted if the test runs show that the desired precision on the workpiece is not met. In the case of gear shaping, for example, the number of shaping strokes per pitch is then increased and the process design is correspondingly adapted. With the process design thus established, the parameters are also set, depending upon which the setpoints for the NC-controlled machine axes are specified, meaning for the rotary spindle drive of the rotational axes of the tool and workpiece rotation, as well as the linear and rotational positioning axes and, in the case of gear shaping, those of the shaper carriage. Using the regulation of these setpoints contained in the NC control, the toothings are then created on the workpieces.

The object of the invention is to achieve the highest possible machining precision with the shortest possible machining times by using a method of this type.

This object is achieved from a methodological perspective by a further development of the method of the aforementioned type, which is essentially characterized in that data containing information relating to a deflection caused by the process forces that arise during machining and resulting in profile shape deviations on the workpiece, of the position of the tool flanks of tool and workpiece out of their position intended as per the process design are used to determine a correction, taking the deflection into account, of the rotation angle position of the workpiece spindle and/or tool spindle and thus to modify the setpoints of the regulation.

In the context of the invention, it is recognized that, because of the process forces that arise, despite a regulation carried out on the specified setpoints, a deflection of the tooth flanks of the workpiece/tool out of their position intended per the process design is responsible for the occurrence of profile shape deviations, which can be countered even without changing the basic process design by modifying the specified setpoints by means of a correction that acts against the deflection, depending upon the process parameters associated with the process design. Thereafter, modified setpoints are given to the NC control that in the basic process design would actually lead to profile shape deviations, but which are directed opposite the deviations arising because of the process forces, so that, as a whole, workpieces having low profile shape deviations from a specified setpoint contour are achieved. This makes it possible to avoid changes of the technology parameters and of the process design or to conduct them only to a limited extent and in this way to also save machining time.

In a preferred embodiment, the setpoint correction is applied periodically. In this context, it is provided that a period length based on the workpiece amounts to 360°/number of teeth of the workpiece.

Furthermore, it can also be provided that the setpoint correction can be designed harmonically overall or, for example, in the first approach, and a non-harmonic correction of a lesser scale is in some cases superimposed onto this harmonic correction.

In a preferred method embodiment, one phase of the correction comprises a phase offset that takes into account the error on the profile of the workpiece in addition to an angular distance of a tooth-gap center of the workpiece from a specified spatially fixed reference angular position. As a result of appropriate matching of the correction and the spatially fixed referenced angular position, the relevant angular distance can also be adjusted to zero by means of a "calibration" of the correction process. The phase offset can thereby be determined, for example, in that a harmonic function (already determined frequency, based on the rotation angle) is set to the best match through a plotted course (based on the rotation angle) of the torque applied by a spindle motor.

In a particularly preferred embodiment of the method, it is provided that an amplitude of the setpoint correction is determined depending on one or a plurality of the following parameters: tool and workpiece diameter and number of teeth, resilience of the tool and workpiece, toothing module, helix angle of the toothing. The resilience of the tool relates to that which is measured at the tool center point, wherein resilience of the workpiece can take this into account including all components in the power flow (measured absolutely).

In a preferred method variant, one machining of a first workpiece is completed before modification of the setpoints, and the setpoint correction is carried out for subsequent workpieces of the same type in which machining is performed under the same process design. This method variant is particularly well-suited in those cases in which a series of a large number of similar workpieces is to be created.

In this variant, it is preferred that the completed workpiece be measured and also that data for the setpoint correction be taken from it. This type of setpoint correction permits an even higher precision in the achievement of profile shapes as close as possible to the desired setpoint profile shape.

In an especially preferred method design, in this variant an amplitude magnitude of the setpoint correction is determined by the maximum dimensional difference measured over the teeth in the profile shape deviation of the measured workpiece. This already results in recognizably lower profile shape deviations. In addition, it can be provided that one or a plurality of the aforementioned parameters is made to influence a fine tuning of the amplitude in order to further optimize the minimization of the profile shape deviations.

In an alternative or supplementary method design, the method is carried out in at least two passes—in particular of different downfeed depths—made on one workpiece, wherein the earlier pass is finished before the setpoint correction and the setpoint displacement is carried out for at least one of the subsequent passes, comprising in particular the last pass, of the workpiece machining. In this variant, a bracing of the workpiece for its intermediate measurement is not required. The setpoint correction is instead accomplished in reference to data that was determined during the previous pass. This method variant is especially suitable for larger workpieces, for example in individual manufacture.

In this context, it is preferably provided that the time course of the readjustment of the actual values to the setpoints that is carried out by the still unmodified regulation is determined during the earlier pass and these readjustment values are used as data for the determination of the setpoint correction.

In a particularly preferred method design, it is also provided that the determination of the setpoint correction is carried out using the recorded deviations of the rotation angle position of the workpiece and/or tool spindle and/or using detected torques actually applied by the spindle motor of workpiece and/or tool spindle based on their torque regulation, in particular taking into account the resilience measured on the workpiece and tool.

Advantageously, the modification of the setpoints goes into the NC control via values of the correction that are prepared in the form of a table. In this manner, already-available operator interfaces of NC control software can be used in an appropriate manner by toothing machines.

The course of the process can also be designed depending upon whether or not measured values of a previous workpiece are available. It is thus provided in one variant that the finishing pass is completely omitted and, for example, modification is accomplished by rolling roughing. In another variant, one can work with an as-yet unmodified first finishing pass (for determination, for example, of torques during finishing) and a modified second finishing pass.

The method according to the invention is also protected in the form of a computer program with program instructions that, if implemented on a toothing machine, controls the machine for carrying out a method according to any of the preceding method aspects.

From an apparatus technology perspective, a toothing machine is placed under protection comprising a rotary tool spindle rotationally driven by a by a spindle drive motor for holding a machining tool and a spindle drive motor to drive a workpiece spindle, an NC control of the rotary spindle drive that comprises a regulation of the rotation angle position of the spindle to the specific setpoints depending on the process parameters input into the machine, characterized by a control that controls the machine for carrying out a method according to any of the aforementioned method aspects or is equipped with a control program as described above.

Especially preferably, the method is used in gear shaping and a correspondingly equipped gear-shaping machine is provided because, based on the additional stroke movement of the tool and the process forces associated with it, the advantages of the method according to the invention are especially evident; however, corresponding applications for gear hobbing and hob peeling are also possible.

Figure 1B:
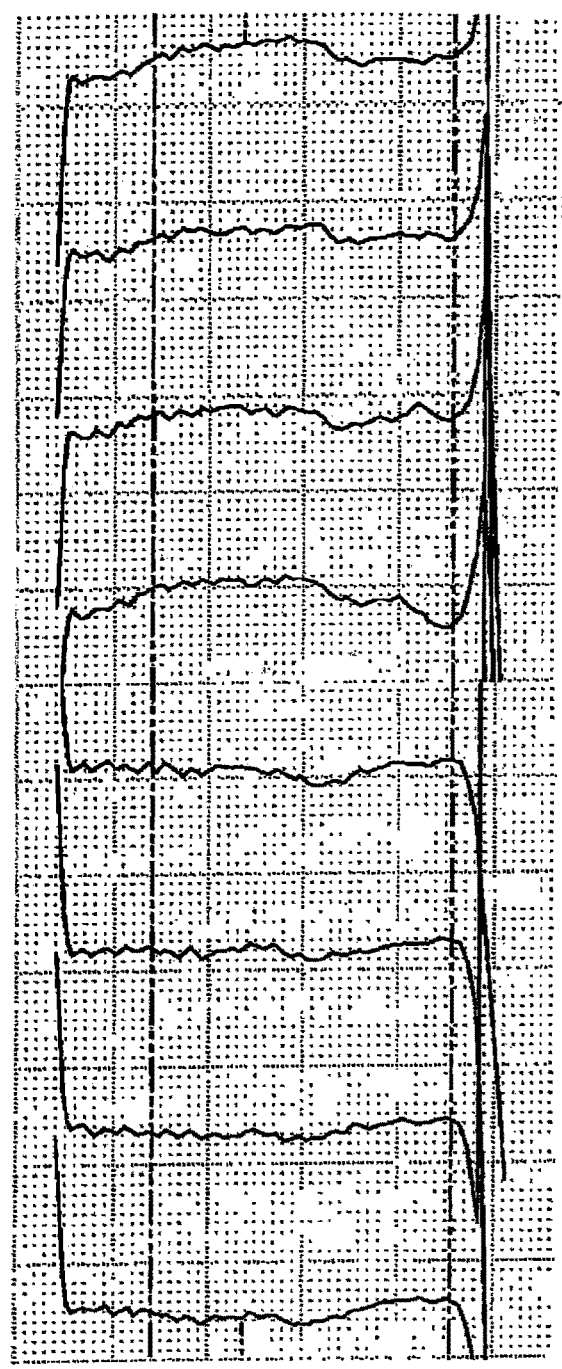
Figure 2:
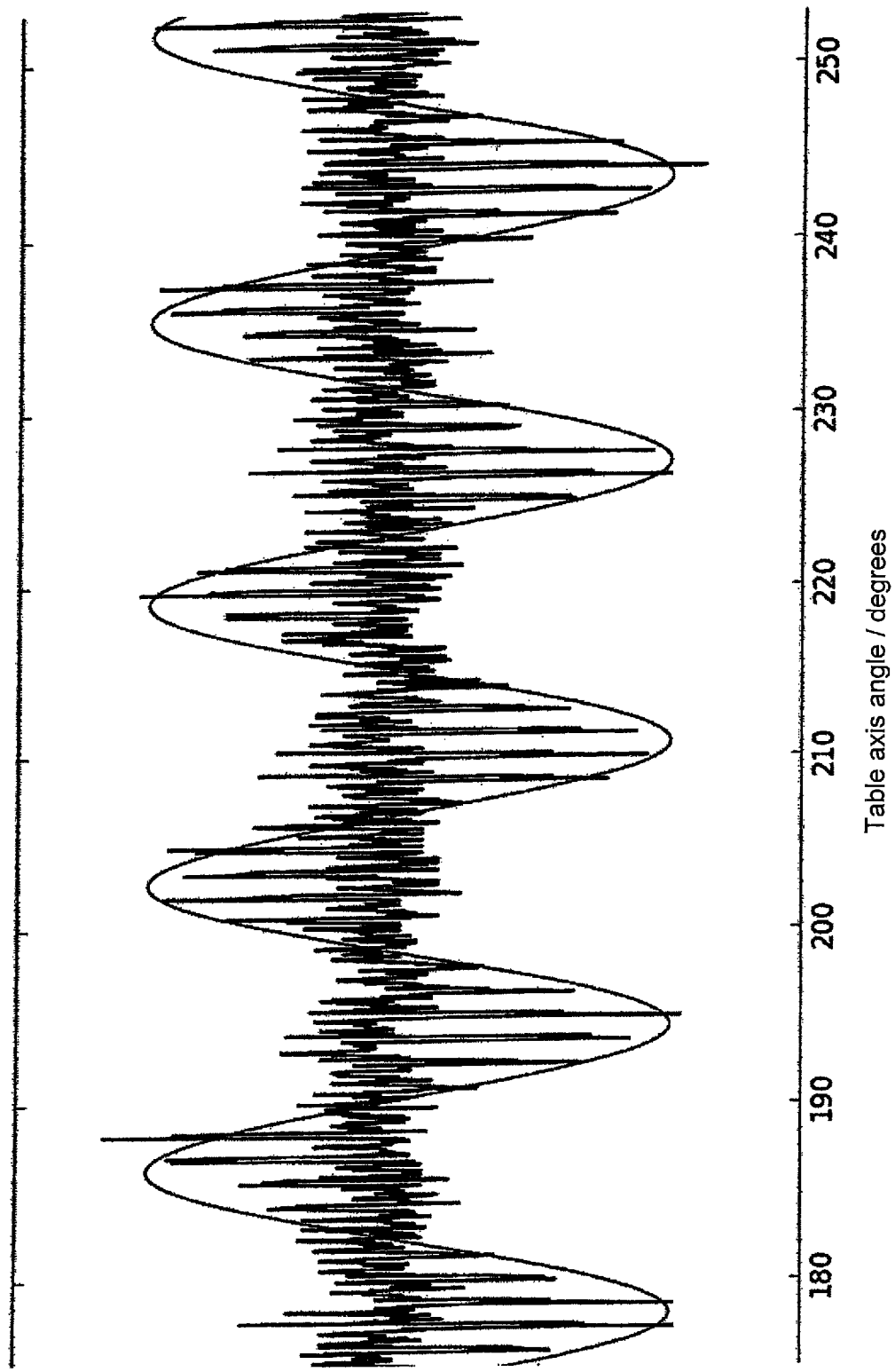

Further features and advantages of the invention are derived from the following description with reference to the attached drawings, of which FIG. 1 is an illustration of the profile shape error measured once on a workpiece after machining still without setpoint modification (FIG. 1a) and once with modification (FIG. 1b), and FIG. 2 is a graphic representation of the sequence of process variables shown with correction mechanisms indicated.

FIG. 1a shows a measurement of the flanks of a workpiece that was produced under specified parameters in the gear shaping process in the manner that is typical for a person skilled in the art. The more precise tool data are not relevant for the following; instead, it is significant for the following explanation of the invention that during the evaluation the profile shape errors existing on the individual tooth flanks were determined that, in this exemplary embodiment, were within the interval from 6.3 to 8.9 μm. This workpiece is, for example, the first workpiece of a larger workpiece series of identical workpieces that are machined sequentially.

These sequential workpieces are, in any case, no longer generated by shaping using the identically controlled method, but in a modified manner, for which purpose the following steps are completed in this illustrative exemplary embodiment as indicated below.

During the finishing cut of the first workpiece, the torques applied by the spindle drive motor of the workpiece spindle were recorded, wherein an illustration related to the rotation angle is selected. The result of this recording is the highly fluctuating pass plotted in FIG. 2. The approach for a harmonic correction in form $$\text{corr}(\varphi) = \hat{\sigma}^{\#} \sin(\omega_\varphi \cdot \varphi + \psi)$$

is then selected and therein the rotation-angle-related frequency $\omega_\varphi$ is set at 2π/tooth count of the workpiece (or 360°/tooth count of the workpiece). By matching the phase ψ, this function is now at first postponed until a best match with respect to the fundamental oscillations of the torque illustrated in FIG. 2 is reached. This is given in the situation represented in FIG. 2 by the solid-line sine curve.

This solid-line sine curve in FIG. 2 is now used as a (specified except for the amplitude) correction function according to the algebraic sign (in some cases the phase ψ, depending upon entry method, is to be further displaced by π or 180° in the NC controller) in order to create the effect counter to the profile deviation. In addition, the previously unspecified amplitude $\hat{\sigma}^{\#}$ is set to half of the average profile shape deviation $f_{f\alpha}$, which, in the exemplary embodiment of the measured gear from FIG. 1a, results in an amplitude of 3.5 μm.

From the correction curve, a correction table can then be created which is in turn related to the rotation angle and which is surrendered to the machine control for machining the subsequent workpieces as a modification of its setpoints for the rotation angle that are otherwise used. The result of this is that the control henceforth outputs setpoints that, viewed purely kinematically, would lead to a profile shape deviation on the workpiece flanks. Because of the machining forces that arise and the deflection of the tooth flanks caused by them, the actually derived profile is then again located closer to the desired setpoint.

The result of this modification can be seen in FIG. 1b, in which a first workpiece is shown measured that is created in the finishing step of the gear shaping machining with modification of the setpoints. In this exemplary embodiment, an average profile shape deviation reduced by almost 50% is achieved, meaning an improvement that can be seen even with the naked eye in the comparison of the graphs from FIGS. 1a and 1b.

If measured values of the profile shape deviation of a previous workpiece are not yet available for the machining of a workpiece, lower profile shape deviations can also be achieved for the just-machined workpiece. To do this, for example after the roughing process in a first finishing step, the torque on the workpiece spindle drive is recorded and a correction function is in turn determined at a rotation-angle-related frequency of 360°/tooth count of the workpiece for a second finishing pass. The phase of the correction function can thus be determined in the same manner as illustrated above. The determination of the amplitude can, for example, be done using considerations of the profile error e, meaning the displacement of the contact point between tool and workpiece during the cut, which comprises a displacement on the side of the workpiece and on the side of the tool:

$$e = \Delta u_{Wz} - \Delta u_{Ws},$$

wherein $\Delta u$ each shows the displacement in the tangential direction. This combines in each case an overlay of torsion and flexure of workpiece or tool, $$\Delta u_{Wz} = \frac{T_{Wz} r_{Wz}}{c_{T,Wz}} + \frac{F_{contact}}{c_{B,Wz}}$$

$$\Delta u_{Ws} = -\frac{T_{Ws} r_{Ws}}{c_{T,Ws}} - \frac{F_{contact}}{c_{B,Ws}},$$

wherein T indicates the torque with the respective index for tool and workpiece, r with the respective index of the radius, $c_T$ indicates the tool-side or workpiece-side torsional rigidity for each with index for tool and workpiece and $c_B$ the respective flexural strength with the respective index, and $F_{contact}$ applies for the contact force:

$$F_{contact} = \frac{T_{Wz}}{r_{Wz}} = \frac{T_{Ws}}{r_{Ws}}.$$

Based on this relationship, the measurement of the torque on the workpiece spindle is sufficient for determining the error e, as illustrated above in FIG. 2, and by plugging the above equations into each other, a linear relationship is obtained $$e = k \cdot T_{Ws}.$$

The recorded torques (illustration as, for example, in FIG. 2) can then be scaled using the factor $k/r_{Ws}$ s and the amplitude of the harmonic correction function also can be adapted in the amplitude direction to these scaled values (if the modification is carried out only on the setpoint correction of the workpiece spindle, for example).

Alternatively, the modification can be configured via the rotation angle regulation of the tool spindle or proportionally divided into workpiece spindle and tool spindle.

Because of the accuracy improvements that can be achieved by the setpoint modification according to the invention, as a further method design the finishing step can be completely omitted and the modification can be carried out by a rolling roughing. In this case, one proceeds in the determination of frequency derived from rotation angle and phase of the correction function as described above with the difference that the torque recording of the previous roughing is applied. Moreover, one will preferably no longer work with an amplitude of the correction function that is constant over time or with respect to the rotation angle position, but instead will use a rotation-angle-dependent amplitude required by the radial feed of the spiral-shaped plunge movement, that is, in general work with a "pseudo-periodic" correction function. For example, one can work with a linearly decreasing amplitude, characterized in that, instead of the aforementioned averaged profile shape deviation, a linear ramp is formed between the tooth having the smallest profile shape deviation and the tooth having the largest.

The invention is not limited to the details illustrated in the accompanying figures in the present description. Instead, the features of the above description as well as those of the following claims can be significant individually and in combination for the implementation of the invention in its different embodiments.

The invention claimed is:

1. A method for creating or machining toothings on workpieces in rolling machining engagement by gear shaping, in which an NC control of the rotary spindle drives of workpiece and tool comprises regulation of the rotation angle position of each particular spindle to setpoints depending upon the process parameters associated with the process design underlying the method, characterized in that data containing information relating to a deflection caused by the process forces that arise during machining and resulting in profile shape deviations on the workpiece, of the position of the tool flanks of tool and workpiece out of their position intended as per the process design, are used to determine a correction, taking the deflection into account, of the rotation angle position of the workpiece spindle and/or tool spindle and thus to modify the setpoints of the regulation wherein an amplitude of the setpoint correction is determined depending upon one or a plurality of the parameters: tool and workpiece diameter and number of teeth, resilience of the tool and workpiece, toothing module, helix angle of the toothing.

2. The method according to claim 1, wherein the setpoint correction is periodic.

3. The method according to claim 2, wherein a workpiece-related period length of the setpoint correction amounts to 360°/number of teeth of the workpiece.

4. The method according to claim 2 wherein one phase of the correction comprises a phase offset in addition to an angular distance of a tooth-gap center of the workpiece to a specified spatially fixed reference angular position.

5. The method according to claim 1 wherein one machining of a first workpiece is completed before modification of the setpoints and the setpoint correction is carried out for subsequent workpieces of the same type, in which machining is performed under the same process design.

6. The method according to claim 5, wherein the finished workpiece is measured and data are drawn therefrom for the setpoint correction.

7. The method according to claim 6, wherein an amplitude magnitude of the setpoint correction is determined by the maximum thickness difference averaged over the teeth in the profile shape deviation.

8. The method according to claim 7, wherein one or a plurality of parameters from tool and workpiece diameter and number of teeth, resilience of the tool and workpiece, toothing module, helix angle of the toothing flow into a fine-tuning of the amplitude.

9. The method according to claim 1 wherein the method is carried out in at least two passes made on one workpiece, the earlier pass is finished before the setpoint correction, and the setpoint displacement is carried out for at least one of the subsequent passes of the workpiece machining.

10. The method according to claim 9, wherein, during the earlier pass, the time course of the readjustment of the actual values that is carried out by the still unmodified regulation is determined by setpoints and is used as the data for the determination of the setpoint correction.

11. The method according to claim 10, wherein the determination of the setpoint correction is carried out based on at least one of the recorded deviations of the rotation angle positions of workpiece and/or tool spindle and the detected torques actually applied by the spindle motor of workpiece and/or tool spindle based on their torque regulation taking into account the resilience of workpiece and tool.

12. The method of claim 9 wherein said at least two passes are of different downfeed depths.

13. The method of claim 9 wherein said at least one of the subsequent passes comprises the last pass.

14. The method according to claim 1 wherein the modification of the setpoints goes into the NC control via values of the correction set up in the form of a table.

15. A computer program having program instructions embodied within a non-transitory computer readable medium that when implemented in a toothing machine, controls the machine for the execution of a method according to claim 1.

16. A toothing machine comprising a rotary tool spindle rotationally driven by a spindle drive motor for holding a machining tool and a spindle drive motor to drive a workpiece spindle, an NC control of the rotary spindle drive that comprises a regulation of the rotation angle position of the spindle to the specific setpoints depending on the process parameters input into the machine, characterized by a control that controls the machine for carrying out a method according to claim 1.

* * * * *